United States Patent
Bin et al.

(10) Patent No.: US 11,865,929 B2
(45) Date of Patent: Jan. 9, 2024

(54) APPARATUS AND METHOD FOR CONTROLLING CHARGING OF ELECTRIC VEHICLE

(71) Applicants: Hyundai Motor Company, Seoul (KR); Kia Corporation, Seoul (KR)

(72) Inventors: Seung Hyeon Bin, Gyeonggi-do (KR); Han Hee Park, Hwaseong-si (KR); Ho Sun Jang, Chungcheongnam-do (KR); Ho Rim Choi, Gyeonggi-do (KR); Tae Il Yoo, Geyonggi-do (KR); Seong Min Kim, Gyeongsangnam-do (KR)

(73) Assignees: Hyundai Motor Company, Seoul (KR); Kia Corporation, Seoul (KR)

( * ) Notice: Subject to any disclaimer, the term of this patent is extended or adjusted under 35 U.S.C. 154(b) by 176 days.

(21) Appl. No.: 17/528,360

(22) Filed: Nov. 17, 2021

(65) Prior Publication Data
US 2022/0203847 A1 Jun. 30, 2022

(30) Foreign Application Priority Data
Dec. 31, 2020 (KR) .......... 10-2020-0189286

(51) Int. Cl.
*B60L 53/122* (2019.01)
*B60L 50/51* (2019.01)
*H02P 6/185* (2016.01)

(52) U.S. Cl.
CPC .......... *B60L 53/122* (2019.02); *B60L 50/51* (2019.02); *H02P 6/185* (2013.01); *B60Y 2200/92* (2013.01)

(58) Field of Classification Search
CPC .. B60L 53/122; B60L 50/51; B60L 2240/423; B60L 3/0061; H02P 6/185; B60Y 2200/92; B60Y 2200/91; Y02T 90/12; Y02T 10/70
USPC ......................................... 307/9.1
See application file for complete search history.

(56) References Cited

U.S. PATENT DOCUMENTS

| 2019/0154465 | A1* | 5/2019 | Moriya | .......... G01D 5/145 |
| 2020/0164755 | A1* | 5/2020 | Smolenaers | ............ B60L 53/53 |
| 2020/0280190 | A1* | 9/2020 | Lehn | ........................ H02J 50/10 |

FOREIGN PATENT DOCUMENTS

KR 10-1967561 B1 4/2019

\* cited by examiner

*Primary Examiner* — Rexford N Barnie
*Assistant Examiner* — Swarna N Chowdhuri
(74) *Attorney, Agent, or Firm* — Fox Rothschild LLP

(57) ABSTRACT

An apparatus for controlling charging of an electric vehicle is configured to calculate a rotor torque expected to occur during charging based on an angle of a rotor provided in a driving motor before charging is performed by multiple input voltages, and allow charging to be performed after inducing the rotor torque to be less than a reference torque by moving the electric vehicle a specified distance to correct the rotor angle when the calculated rotor torque is greater than the reference torque so as to avoid deterioration or damage to a parking sprag. As a result, it is possible to prevent the parking sprag from being damaged by the rotor torque generated during charging so as to avoid the occurrence of an accident.

16 Claims, 5 Drawing Sheets

ＵＳ 11,865,929 B2

APPARATUS AND METHOD FOR CONTROLLING CHARGING OF ELECTRIC VEHICLE

CROSS-REFERENCE TO RELATED APPLICATION

This application claims under 35 U.S.C. § 119(a) the benefit of Korean Patent Application No. 10-2020-0189286, filed in the Korean Intellectual Property Office on Dec. 31, 2020, the entire contents of which are incorporated herein by reference.

BACKGROUND

(a) Technical Field

The present disclosure relates to an apparatus and method capable of improving safety during quick charging of an electric vehicle battery, more particularly, to the apparatus and method configured to allow charging to be performed after inducing a rotor torque to be less than a reference torque by moving the electric vehicle a specified distance to correct a rotor angle when the rotor torque is greater than the reference torque so as to avoid causing deterioration or damage to a parking sprag.

(b) Description of the Related Art

Recently, a charging scheme has been utilized by multiple input voltages, which enables quick charging in both 500 V and 1000 V class charging infrastructure even for high voltage batteries of 800 V or higher provided in electric vehicles, by enabling a voltage boost by using a power conversion switch including a three-phase coil and an inverter provided in a driving motor.

When a high-voltage battery is charged after the voltage boost using the three-phase coil and inverter of the driving motor for charging by multiple input voltages, a magnetic field, which is caused by current supplied to the three-phase coil of the driving motor for the voltage boost, generates a force that aligns the magnetic field generated from the permanent magnet inside a rotor provided in the driving motor, and rotor torque is generated by the force.

In general, when charging by multiple input voltages, charging is possible only in a situation where it is confirmed that a gear is at stage P in order to protect a driving system from rotation of the driving motor that may be caused during charging. In addition, a parking sprag is coupled to fix the gear to stage P.

However, because the parking sprag is continuously affected by the rotor torque generated by the current supplied to the three-phase coil of the driving motor during charging, the parking sprag is easily deteriorated and the durability thereof is reduced, thereby increasing the possibility of damage.

In addition, as described above, in the case where the parking sprag is destroyed or damaged, when a force greater than a static friction force is applied even though the gear is fixed to the P-stage in the parking state, the vehicle may be moved by rotation of the driving motor, which may cause an accident.

SUMMARY

An aspect of the present disclosure provides an apparatus and a method for controlling charging of an electronic device capable of calculating a rotor torque expected to occur during charging based on an angle of a rotor provided in a driving motor before charging is performed by multiple input voltages, and allowing charging to be performed after inducing the rotor torque to be less than a reference torque by moving a vehicle a specified distance to correct the rotor angle when the calculated rotor torque is greater than the reference torque that may cause deterioration or damage to a parking sprag, such that it is possible to prevent the parking sprag from being damaged by the rotor torque generated during charging and the possible occurrence of an accident.

The technical problems to be solved by the present inventive concept are not limited to the aforementioned problems, and any other technical problems not mentioned herein will be clearly understood from the following description by those skilled in the art to which the present disclosure pertains.

According to an aspect of the present disclosure, an apparatus for controlling charging of an electric vehicle includes a quick charge determination module that compares a voltage level of a charging power source supplied from electric vehicle supply equipment (EVSE) with a level of a voltage standard received from a high-voltage battery provided in the electric vehicle to determine whether to directly supply or boost supply of the charging power source, an inverter that boosts the voltage of the charging power source supplied from the electric vehicle supply equipment to a specified level or more and provides the boosted voltage to the high-voltage battery when the voltage level of the charging power source supplied for quick charging is less than the voltage standard, a driving motor that is provided with a stator three-phase coil receiving the charging power source from the electric vehicle supply equipment, and a protection mode control module that calculates rotor torque that is generated during charging based on an angle of a rotor provided in the driving motor before the quick charging, and induces the rotor torque to be less than preset reference torque.

In addition, the protection mode control module may include a charging preliminary information reception device that receives vehicle stop information, the angle of the rotor provided in the driving motor, and an intensity of a charging current of the battery before charging as preliminary information for determining whether to charge, and a protection mode execution determining device that compares the rotor torque with the preset reference torque to determine whether to execute a protection mode after calculating the rotor torque expected to occur during the charging based on the angle of the rotor and the intensity of the charging current of the battery.

In addition, the charging preliminary information reception device may receive the angle of the rotor in a vehicle stopped state from a resolver that measures a position of the rotor provided in the driving motor.

In addition, the protection mode execution determining device may execute charging when the rotor torque is less than the reference torque, and determine to execute the protection mode that induces the charging after taking action to reduce the rotor torque when the rotor torque is greater than the reference torque.

In addition, the protection mode control module may further include a protection distance calculating device that calculates, as a protection distance for executing the protection mode, a required travel distance of the vehicle required to correct a current rotor angle such that the rotor torque, which is expected to occur during the charging, is reduced to less than the reference torque when it is determined to execute the protection mode.

In addition, the protection distance calculating device may calculate, as an electric angle difference, a difference between the current rotor angle (electric angle) received through a resolver and the rotor angle (electric angle) when the rotor torque is 0 torque (zero torque), and calculate, as the protection distance, the required travel distance to be moved to correct the rotor angle using the electric angle difference and a tire dynamic radius.

In addition, the apparatus may further include an audio video navigation (AVN) module that receives and displays whether the protection mode is executed and the protection distance to which a driver must move the vehicle from the protection distance calculating device.

According to another aspect of the present disclosure, a method of controlling charging of an electric vehicle includes boosting a voltage of a charging power source to a specified level or higher and supplying the boosted voltage when a voltage level of the charging power source supplied from electric vehicle supply equipment (EVSE) is less than a voltage standard received from a high-voltage battery provided in the electric vehicle, otherwise determining to supply the voltage of the charging power source directly to the high-voltage battery, receiving vehicle stop information, an angle of a rotor provided in a driving motor, and an intensity of a charging current supplied to the battery as preliminary information for determining whether to charge before charging is performed, and determining whether to execute a protection mode by comparing a rotor torque with preset reference torque after calculating the rotor torque expected to occur during charging based on the angle of the rotor and the intensity of the charging current.

In addition, the method may further include calculating, as a protection distance, a required travel distance of the vehicle required to correct the angle of the rotor such that the rotor torque, which is expected to occur during the charging, is reduced to less than the reference torque when it is determined to execute the protection mode.

In addition, the receiving of the charging preliminary information may further include receiving the angle of the rotor that is stopped in a state where the vehicle is stopped and a parking gear is shifted to stage P from a resolver that measures a position of the rotor provided in the driving motor.

In addition, the determining of whether to execute the protection mode may include determining whether the vehicle is in a stopped state for charging based on the stop information, and calculating a magnitude of the rotor torque to be generated while the charging is performed using the angle of the rotor and a maximum intensity of the charging current of the high-voltage battery.

In addition, the determining of whether to execute the protection mode may further include comparing the rotor torque with the preset reference torque, and inducing the charging to start after executing the protection mode in which the rotor torque is reduced when the rotor torque is greater than the reference torque.

In addition, the calculating of the protection distance may include calculating a difference between a current rotor angle (electric angle) received from a resolver and A rotor angle (electric angle) when the rotor torque is 0 torque (zero torque), and calculating, as the protection distance, the required travel distance to be moved to correct the current rotor angle to offset the electric angle difference by using the electric angle difference and a tire dynamic radius.

In addition, the method may further include displaying a result of a determination to execute the protection mode in the determining of the protection mode execution and the protection distance calculated in the calculating of the protection distance through an AVN module so that a driver recognize the result and the protection distance.

BRIEF DESCRIPTION OF THE DRAWINGS

The above and other objects, features and advantages of the present disclosure will be more apparent from the following detailed description taken in conjunction with the accompanying drawings.

DETAILED DESCRIPTION

Figure 1:
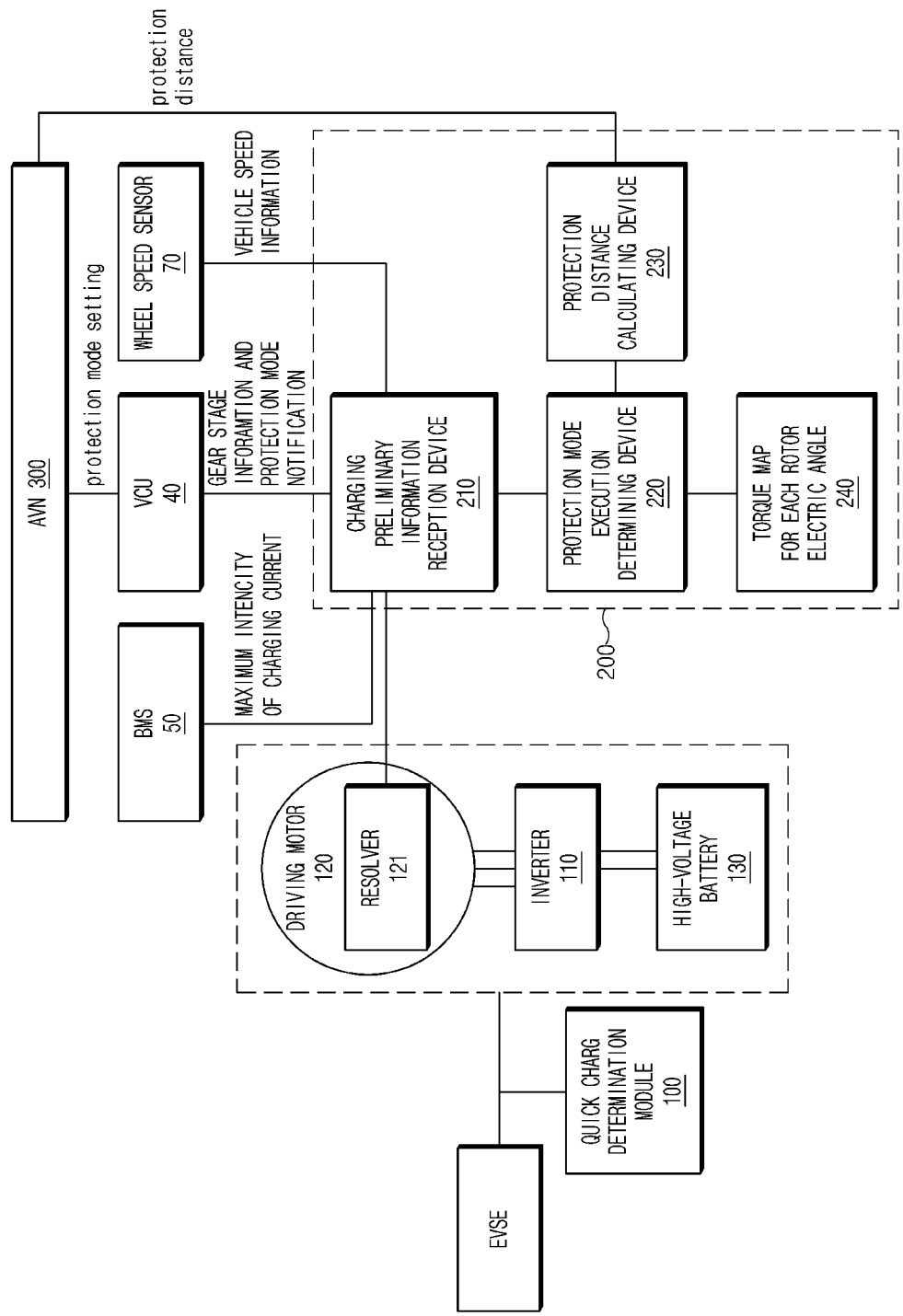
FIG. 1 is a block diagram illustrating an apparatus for controlling charging of an electric vehicle according to the present disclosure.

It is understood that the term "vehicle" or "vehicular" or other similar term as used herein is inclusive of motor vehicles in general such as passenger automobiles including sports utility vehicles (SUV), buses, trucks, various commercial vehicles, watercraft including a variety of boats and ships, aircraft, and the like, and includes hybrid vehicles, electric vehicles, plug-in hybrid electric vehicles, hydrogen-powered vehicles and other alternative fuel vehicles (e.g. fuels derived from resources other than petroleum). As referred to herein, a hybrid vehicle is a vehicle that has two or more sources of power, for example both gasoline-powered and electric-powered vehicles.

The terminology used herein is for the purpose of describing particular embodiments only and is not intended to be limiting of the disclosure. As used herein, the singular forms "a," "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. As used herein, the term "and/or" includes any and all combinations of one or more of the associated listed items. Throughout the specification, unless explicitly described to the contrary, the word "comprise" and variations such as "comprises" or "comprising" will be understood to imply the inclusion of stated elements but not the exclusion of any other elements. In addition, the terms "unit", "-er", "-or", and "module" described in the specification mean units for processing at least one function and operation, and can be implemented by hardware components or software components and combinations thereof.

Further, the control logic of the present disclosure may be embodied as non-transitory computer readable media on a computer readable medium containing executable program instructions executed by a processor, controller or the like. Examples of computer readable media include, but are not limited to, ROM, RAM, compact disc (CD)-ROMs, magnetic tapes, floppy disks, flash drives, smart cards and optical data storage devices. The computer readable medium can also be distributed in network coupled computer systems so that the computer readable media is stored and executed in a distributed fashion, e.g., by a telematics server or a Controller Area Network (CAN).

Hereinafter, some embodiments of the present disclosure will be described in detail with reference to the exemplary drawings. In adding the reference numerals to the components of each drawing, it should be noted that the identical or equivalent component is designated by the identical numeral even when they are displayed on other drawings. Further, in describing the embodiment of the present disclosure, a detailed description of the related known configuration or function will be omitted when it is determined that it interferes with the understanding of the embodiment of the present disclosure.

In describing the components of the embodiment according to the present disclosure, terms such as first, second, A, B, (a), (b), and the like may be used. These terms are merely intended to distinguish the components from other components, and the terms do not limit the nature, order or sequence of the components. Unless otherwise defined, all terms including technical and scientific terms used herein have the same meaning as commonly understood by one of ordinary skill in the art to which this disclosure belongs. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

Hereinafter, with reference to FIGS. 1 to 5, embodiments of the present disclosure will be described in detail.

Figure 2:
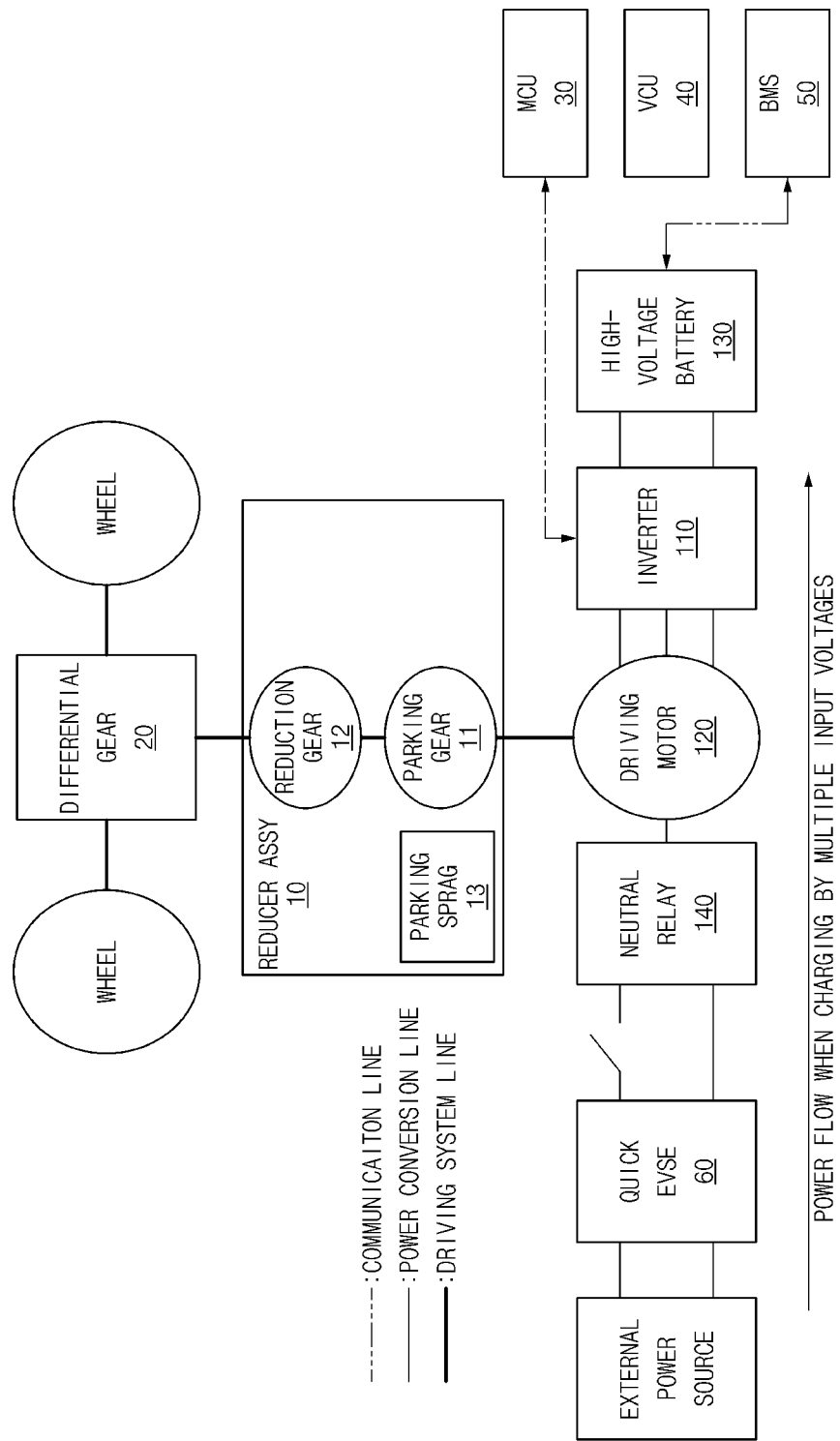
FIG. 2 is a block diagram illustrating a connection structure with electric vehicle supply equipment (EVSE) for charging by multiple input voltages according to the present disclosure.

FIG. 1 is a block diagram illustrating an apparatus for controlling charging of an electric vehicle according to the present disclosure. FIG. 2 is a block diagram illustrating a connection structure with electric vehicle supply equipment (EVSE) for charging by multiple input voltages according to the present disclosure.

Referring to FIG. 1, an apparatus for controlling charging of an electric vehicle according to the present disclosure may include a quick charge determination module that compares a voltage level of a charging power source supplied from electric vehicle supply equipment (EVSE) with a level of a voltage standard received by a high-voltage battery provided in the electric vehicle to determine whether to directly supply or boost supply of the charging power source, an inverter that boosts the voltage of the charging power source supplied from the electric vehicle supply equipment to a specified level or more and provides the boosted voltage to the high-voltage battery when the voltage level of the charging power source supplied for quick charging is less than the voltage standard, a driving motor that is provided with a stator three-phase coil receiving charging power source from the electric vehicle supply equipment, and a protection mode control module that calculates rotor torque that is generated during charging based on an angle of a rotor provided in the driving motor before quick charging, and induces the rotor torque to be less than preset reference torque.

Generally, as a scheme of charging a high-voltage battery provided in an electric vehicle, there are slow charging and quick charging. In a quick charging scheme, the power converted into DC is supplied from an external charging infrastructure through EVSE for charging. As described above, as the charging infrastructure for quick charging, 50 KW-500V/100 A, 100 KW-500V/200 A, 200 KW-500V/400 A, and 400 KW-1000V/400 A class infrastructures have been used at home and abroad.

In addition, recently, in the case of an electric vehicle, the application of a battery having a voltage of 800 V or higher has been increased in order to improve power consumption efficiency, driving distance, and the like. Thus, in the case of 1000 V class charging infrastructure, although it is permissible to use the existing quick charging scheme as it is, when using 500 V class charging infrastructure, the output voltage of the charging infrastructure itself is only 500 V, so that it is necessary to boost the output voltage to the battery voltage level for quick charging before supplying the output voltage to the high-voltage battery.

Accordingly, a quick charge determination module 100 may determine whether the voltage of the charging power source is directly supplied or supplied after boosting by comparing the output of the charging power source supplied from the EVSE to quickly charge with the voltage standard of the high-voltage battery.

To this end, the quick charge determination module 100 may compare the voltage level of the charging power source supplied from the EVSE with the voltage standard level of the high-voltage battery. When the voltage level of the charging power source is higher than or equal to the voltage standard level of the high-voltage battery, the charging power source may be directly supplied to the high-voltage battery. Otherwise, the voltage of the charging power source may be boosted to the level corresponding to the voltage standard level of the high-voltage battery and then, is supplied, thereby enabling quick charging.

Therefore, quick charging is possible through not only the charging infrastructure having the maximum output greater than the charging voltage of the high-voltage battery, but also the charging infrastructure having the maximum output less than the charging voltage of the high-voltage battery by the quick charge determination module 100.

As described above, even when the output of the charging power source has various voltage levels, that is, when multiple input voltages are supplied as charging power sources by various types of charging infrastructure, quick charging is possible through appropriate boosting, thereby improving the convenience in charging the high-voltage battery.

To this end, as shown in FIG. 2, a boosting circuit may implemented with an inverter 110 that boosts the voltage of the charging power source supplied from EVSE 60 by pulse width modulation (PWM) control, a driving motor 120 that is provided with a stator three-phase coil that receives charging power from the EVSE, and a neutral relay 140 that electrically connects the EVSE to the driving motor and the inverter before performing charging by multiple input voltages.

In this case, the driving motor 120, which is a power generating device, as shown in FIG. 2, may receive DC power of a high-voltage battery 130 which is converted into three-phase AC power by the inverter 110, to generate power for driving wheels, and may transmit the driving power to the reduction assembly 10. As described above, the power generated from the driving motor is transmitted to a differential gear 20 to which the wheels of the vehicle are connected through a reduction gear 12 so as to have an appropriate gear ratio in the reduction device 10, so that the vehicle can be driven.

However, in order to act as a boost circuit for quick charging not only when receiving power from the high-voltage battery as a power generating device, but also when charging the high-voltage battery, the current of the charging power source must be supplied to the three-phase coil of the stator of the driving motor. As described above, the driving motor rotates the driving shaft by the current supplied to the three-phase coil of the stator, so that the vehicle may move during charging.

Accordingly, for quick charging, the vehicle's gear is in the P stage, which is a parking gear 11, and the charging by multiple input voltages may be performed only when the vehicle speed is 0 KPH. In this case, in order to prevent the parking gear from loosening, a parking sprag 13 is fastened to the teeth of the parking gear to prevent the driving force generated from the motor from being transmitted to the reduction gear and the differential gear.

In addition, discharging for converting DC power supplied from the high-voltage battery into 3-phase AC power in the inverter and supplying it to a driving motor, and charging for supplying the high-voltage battery by boosting the voltage supplied through the EVSE in the inverter may be controlled by a motor controller (MCU) 30 already provided in the vehicle.

In this case, the motor controller (MCU) 30 may transmit various information (current, temperature, position, etc.) to drive the driving motor and then execute PWM control in the inverter. In addition, the MCU 30 may perform various control for controlling the driving motor such as inverter or motor fault diagnosis and cooperative control, etc.

In addition, in FIG. 2, a battery management system (BMS) 50 for controlling and monitoring the high-voltage battery, and a vehicle control unit (VCU) 40, which is a higher level controller for executing cooperative control of a motor controller or battery management system provided in the vehicle are shown together, so that it is illustrated that the motor driving control is implemented by mutual control of these controllers.

As described above, boosting the voltage of the charging power source supplied to the high-voltage battery by the switching of the inverter is widely used in quick charging by multiple input voltages, and thus, the detailed description of the switch structure and the operation of the inverter for boosting a voltage will be omitted.

In addition, a protection mode control module 200 may include a charging preliminary information reception device 210 that receives vehicle stop information, the angle of the rotor provided in the driving motor, and the intensity of a charging current of the battery before charging as preliminary information for determining whether to charge, a protection mode execution determining device 220 that compares the rotor torque with preset reference torque to determine whether to execute a protection mode after calculating the rotor torque expected to occur during charging based on the angle of the rotor and the intensity of the charging current of the battery, and a protection distance calculating device 230 that calculates, as a protection distance for executing the safe charging, a required travel distance of the vehicle required to correct a current rotor angle such that the rotor torque, which is expected to occur during charging, is reduced to less than the reference torque when it is determined to execute the protection mode.

Before charging, the charging preliminary information reception device 210 may receive whether the vehicle's gear is shifted to the P-stage which is the parking gear and whether the vehicle's speed is 0 KPH from a VCU 40. In this case, of course, the parking sprag is fastened to the teeth of the parking gear while the gear of the vehicle is shifted to the P-stage.

As described above, the charging preliminary information reception device 210 may receive the vehicle gear stage information transmitted from the VCU 40 and the vehicle speed information transmitted from a wheel speed sensor 70 as stop information, so that it is possible to recognize that the vehicle is in a stationary state for charging.

In this case, the charging preliminary information reception device 210 may receive the protection mode execution request of the user input by manipulating an audio video navigation (AVN) module 300 provided in the vehicle operating through the VCU 40.

In addition, the charging preliminary information reception device 210 may receive the angle of the rotor from a resolver 121 for measuring the position of the rotor provided in the driving motor, and receive the maximum intensity of charging current that may be supplied to the high-voltage battery as charging power from the BMS 50.

Figure 3:
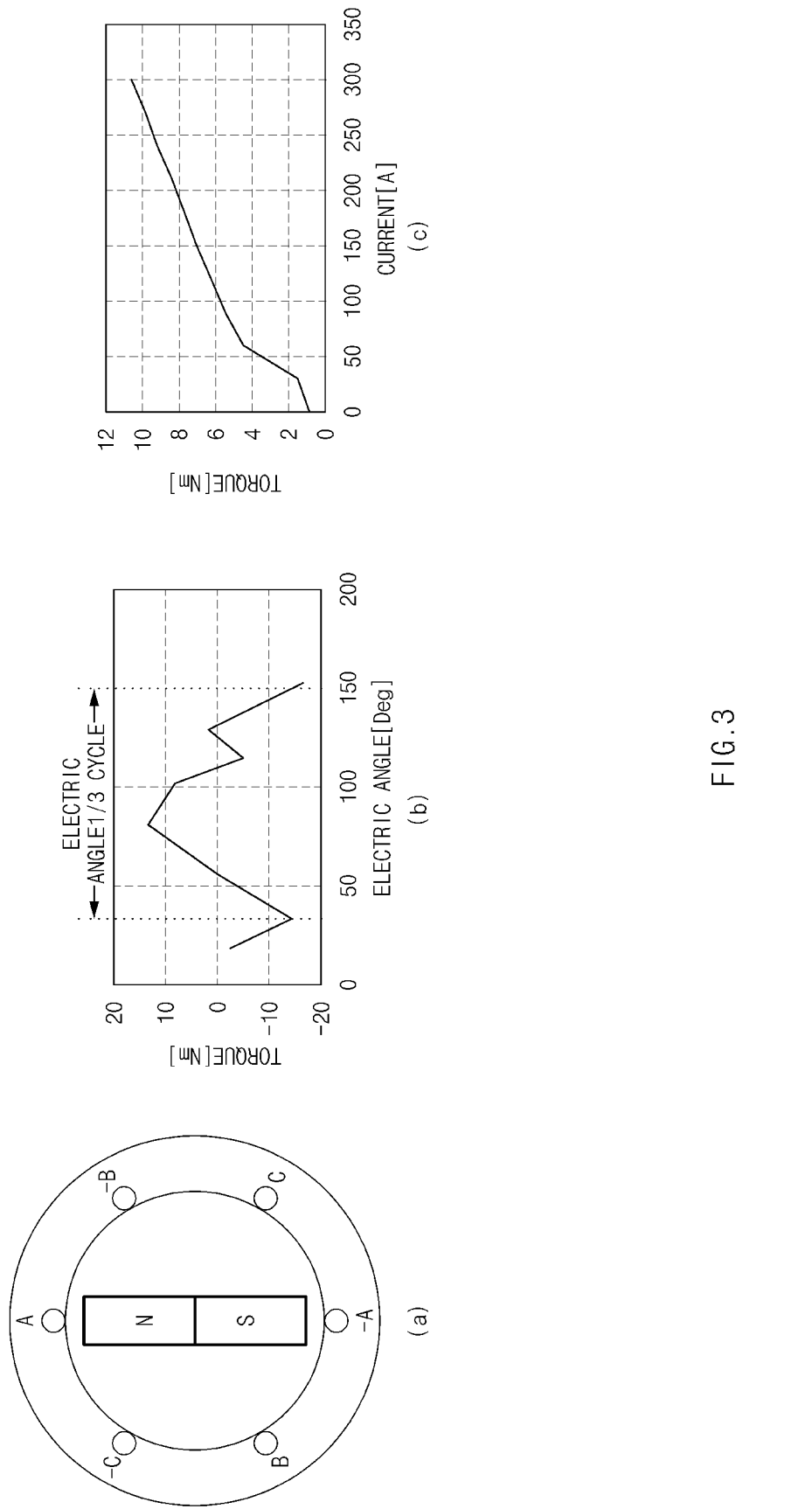
FIG. 3 is a view illustrating the relationship between an electric angle, the intensity of electric current and the magnitude of torque.

In this case, as shown in (a) of FIG. 3, the angle of the rotor may be measured based on the electric angle at the position where the permanent magnet of the rotor located in the center in the structure of the driving motor including the rotor and the stator. That is, the rotor sequentially rotates in the order of A→(−B)→C→(−A)→B→(−C)→A, so that the rotor rotates one electric angular cycle. The electric angle of the rotor at the position where the driving of the vehicle is stopped during these sequential rotations may be measured as the angle of the rotor.

In addition, after determining that the vehicle is in a stopped state based on the gear stage information and vehicle speed information, the protection mode execution determining device 220 may use the angle of the rotor and the maximum intensity of the charging current of the battery to calculate the rotor torque to be generated in the driving motor during charging.

That is, during charging, the current supplied to the three-phase coil provided in the stator of the driving motor generates a constant magnetic field, and the magnetic field thus generated causes a force to align the magnetic field generated by the permanent magnet inside the rotor. In addition, the rotor torque to rotate the rotor is generated by the force.

As shown in (b) of FIG. 3, in general, the three-phase coil provided in the driving motor spatially has an electric angle between phases arranged in ⅓ cycle, so that the torque generated when the same current flows through the three-phase coil becomes the third harmonic component of the electric angle.

That is, according to the angle of the rotor measured at the beginning of charging, while current is supplied to the stator three-phase coil for boosting the voltage of the charging power source, a force corresponding to the 3-harmonic torque generates rotor torque that rotates the rotor. In addition, as shown in (c) of FIG. 3, the rotor torque increases in proportion to the intensity of the charging current flowing in the stator three-phase coil.

As described above, the rotor torque generated in proportion to the angle of the rotor and the intensity of the charging current generates a force to rotate the driving shaft connected to the parking gear. As a result, the force is continuously applied to the parking sprag coupled to the parking gear, thereby causing deterioration or durability damage of the parking sprag.

Accordingly, the protection mode execution determining device 220 may compare the magnitude of the rotor torque calculated by using the angle of the rotor and the intensity of the current flowing in the three-phase coil with that of preset reference torque. When the rotor torque is greater than the reference torque, it may be determined that the protection mode for inducing the start of quick charging after taking a measure to reduce the rotor torque is executed.

To this end, as shown in (c) of FIG. 3, the protection mode control module 200 may further include a rotor electrical angle torque map 240 in which rotor torques for each electric angle of the rotor are matched and stored after the rotor torque expected to occur during charging according to the electric angle of the rotor is calculated in advance.

In addition, the protection mode control module 200 may further include a memory (not shown) that stores a reference torque having a magnitude that deteriorates or damages the parking sprag, which is experimentally calculated in advance.

Accordingly, the protection mode execution determining device 220 may derive the electric angle of the rotor corresponding to the angle of the rotor received from the resolver after the vehicle is stopped from the rotor electric angle torque map, and after calculating the rotor torque matched to the electric angle of the rotor, may determine whether to execute the protection mode by comparing the rotor torque with the reference torque stored in the memory in advance.

That is, the protection mode execution determining device 220 may determine that the charging is performed when the rotor torque is less than the reference torque, but the protection mode is executed in which the charging is induced after reducing the rotor torque when the rotor torque is greater than the reference torque.

In this case, the magnitude of the rotor torque compared with the reference torque in the protection mode execution determining device 220 may be determined by reflecting the increase in the magnitude of the maximum torque that may be generated depending on the intensity of the current flowing in the three-phase coil, to the rotor torque calculated according to the angle of the rotor.

In addition, the protection distance calculating device 230 may calculate, as the protection distance for executing the charging of the vehicle, a required travel distance of the vehicle required to correct a current rotor angle such that the rotor torque, which is expected to occur during charging, is reduced to less than the reference torque when it is determined to execute the protection mode.

The magnitude of the charging current supplied from the charging infrastructure and the maximum current of the high-voltage battery receiving the charging current and charged with the charging current is already fixed. Accordingly, the protection distance calculating device 230 may correct the angle of the rotor that may be changed through the rotation of the driving shaft by the driving motor so that the rotor torque can be generated smaller than the reference torque, thereby preventing excessive force from being applied to the parking sprag.

To this end, the protection distance calculating device 230 may calculate, as the difference between electric angles, the difference between the current rotor angle (electric angle) received through the resolver and the rotor angle (electric angle) when the rotor torque is 0 torque (zero torque), and may calculate, as the protection distance, the required travel distance to be moved to correct the rotor angle by using the electric angle difference calculated through following Equation 1 and the tire dynamic radius.

As described above, the required travel distance calculated by the protection distance calculating device 230 protects the parking sprag that may be damaged due to the rotor torque expected to occur during charging, and protects the driver from the shock caused due to damage to the parking sprag. This will be referred to as the protection distance.

$$\text{Required travel distance} = \text{electric angle difference} \times \frac{\frac{2}{p}}{360} \times 2\pi \times \text{tire dynamic radius} \quad \text{[Equation 1]}$$

That is, because the electric angle may be expressed as a mechanical angle using the number of poles P of the driving motor expressed as following Equation 2, the travel distance of the vehicle according to the mechanical rotation degree of the driving motor may be expressed as following Equation 3 by the relational expression between the mechanical angle which indicates the degree of rotation and the tire dynamic radius.

Therefore, according to the relationship between Equation 2 and Equation 3, as in Equation 1, it is possible to calculate the necessary travel distance that the vehicle must travel in order to minimize the rotor torque by using the difference in the electric angle.

$$\text{Electric angle} = \text{Mechanical angle} \times (p/2) \quad \text{[Equation 2]}$$

$$\text{Vehicle travel distance} = \text{Driving motor mechanical angle}/360 \times 2\pi \times (\text{Tire dynamic radius}) \quad \text{[Equation 3]}$$

In addition, in order to display the protection distance calculated by the protection distance calculating device 230 to allow the driver to recognize the protection distance, the AVN module 300 may be further included, which receives and displays whether the protection mode is executed from the protection distance calculating device 230 and the protection distance that the driver must move the vehicle.

As described above, after recognizing the protection distance displayed by the AVN module 300 and moving the vehicle, the corrected rotor angle in the state where the gear stage is positioned at the parking gear may be received from the resolver 121 again In addition, the protection mode execution determining device 220 may compare the rotor torque recalculated based on the corrected rotor angle with the reference torque again to determine whether to terminate the protection mode and execute charging, or additionally execute the protection mode.

As described above, it is possible to prevent components from being unexpectedly damaged by performing charging within the range of the rotor torque in which the damage of the parking sprag is not caused.

In addition, by preventing the damage of the parking sprag that is fastened to the teeth of the parking gear to prevent the movement of the vehicle and maintained at the P-stage during charging, even though charging is performed at the rotor angle at which the rotor torque greater than the static friction force is generated, the movement of the vehicle may be prevented by the solid parking sprag, thereby preventing a safety accident from occurring.

As described above, according to an embodiment of the present disclosure, the protection mode execution determining device that calculates a rotor torque from a rotor electric angle torque map stored in a memory or the like using the rotor angle received from the resolver and then executes a logic to compare it with a reference torque, and the protection distance calculating device that executes the logic that calculates the protection distance that can minimize the rotor torque and transmit it to the AVN module may be implemented in the MCU, so that it is possible to improve the safety of charging without the addition of components or systems.

Next, a method of controlling charging of an electric vehicle according to another embodiment of the present disclosure will be described with reference to FIGS. 4 and 5.

Figure 4:
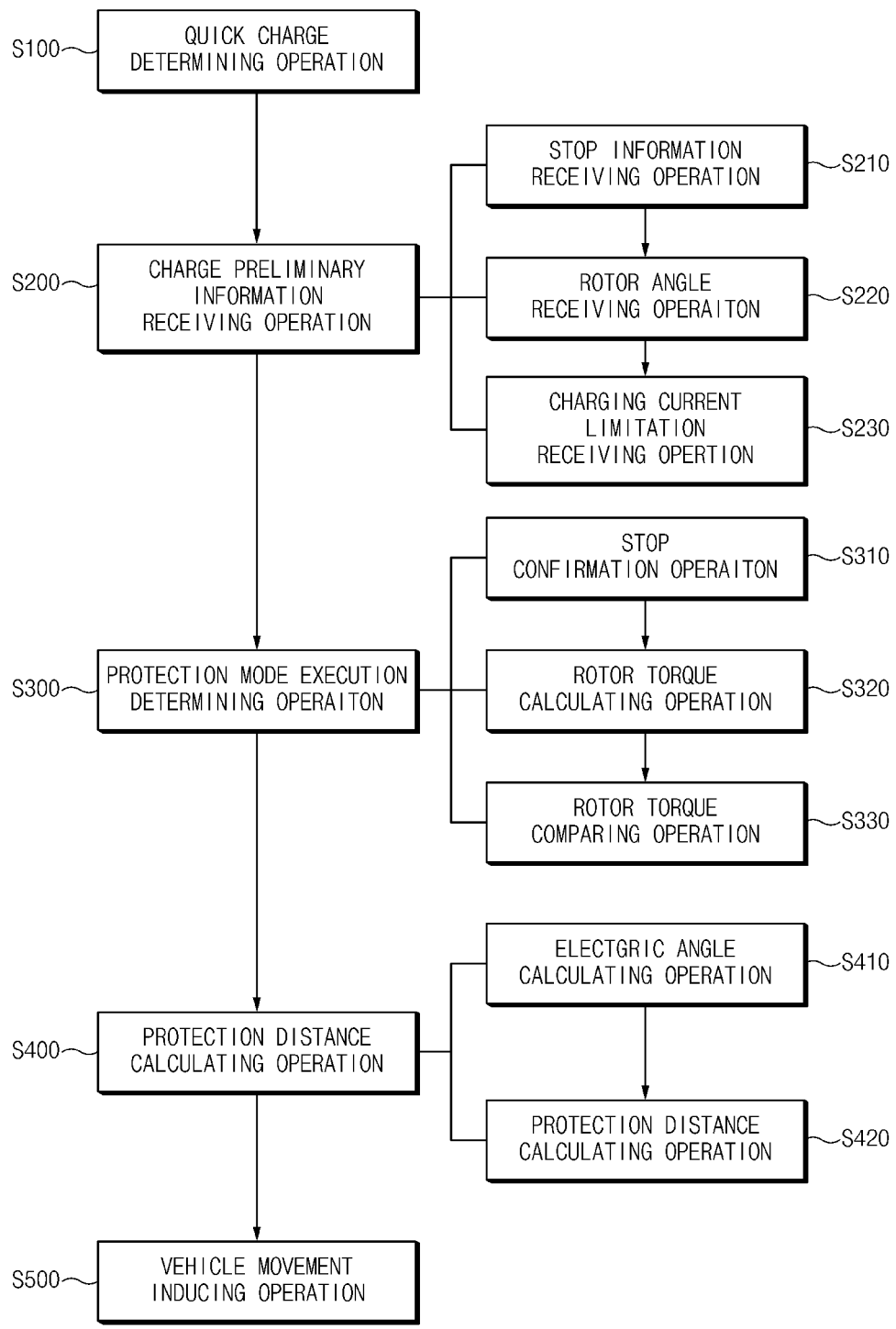
FIG. 4 is a flowchart illustrating a method of controlling charging of an electric vehicle according to another embodiment of the present disclosure.

FIG. 4 is a flowchart illustrating a method of controlling charging of an electric vehicle according to another embodiment of the present disclosure. FIG. 5 is a flowchart illustrating a flow in which a protection mode is executed during quick charging according to still another embodiment of the present disclosure.

Figure 5:
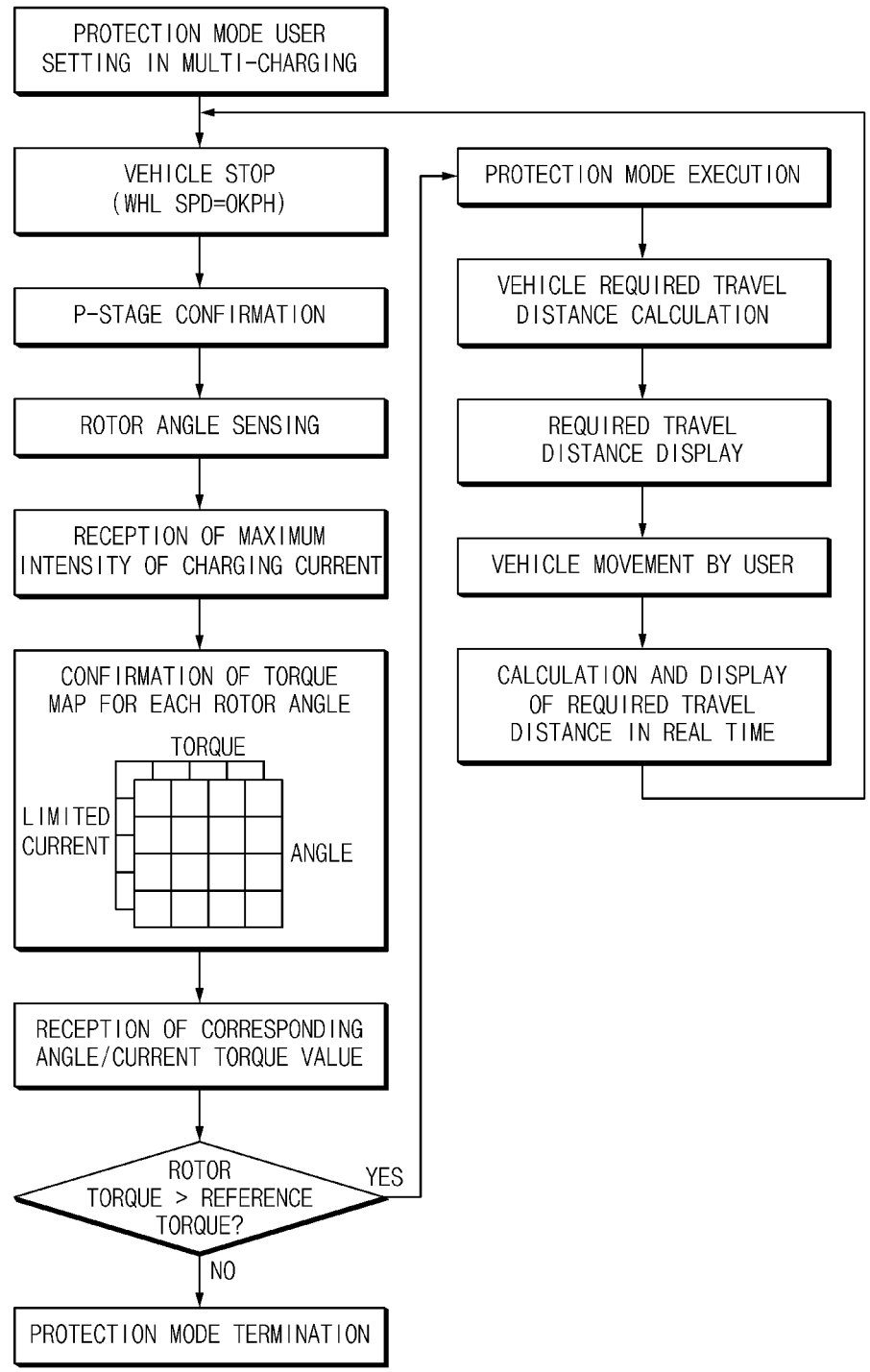
FIG. 5 is a flowchart illustrating a flow in which a protection mode is executed when charging by multiple input voltages according to still another embodiment of the present disclosure.

Referring to FIGS. 4 and 5, a method of controlling charging of an electric vehicle according to another embodiment of the present disclosure includes a quick charge determination operation S100 of boosting a voltage of a charging power to a specified level or higher and supplying the boosted voltage when a voltage level of the charging power supplied from electric vehicle supply equipment (EVSE) is less than a voltage standard received from a high-voltage battery provided in the electric vehicle, otherwise determining to supply the voltage of the charging power directly to the high-voltage battery, a charging preliminary information receiving operation S200 of receiving vehicle stop information, an angle of a rotor provided in a driving motor, and an intensity of a charging current supplied to the battery as preliminary information for determining whether to charge before charging is performed, a protection mode execution determining operation S300 of determining whether to execute a protection mode by comparing a rotor torque with preset reference torque after calculating the rotor torque expected to occur during charging based on the angle of the rotor and the intensity of the charging current, and a protection distance calculating operation S400 of calculating, as a protection distance, a required travel distance of the vehicle required to correct the angle of the rotor such that the rotor torque, which is expected to occur during charging, is reduced to less than the reference torque when it is determined to execute the protection mode.

In the quick charge determination operation S100, it may be determined whether the voltage of the charging power source is directly supplied or supplied after boosting by comparing the output of the charging power source supplied from the EVSE with the voltage standard of the high-voltage battery.

That is, as the comparison result in the quick charge determination operation S100, when the voltage level of the charging power source is greater than or equal to the voltage standard level of the high-voltage battery, the power may be directly supplied to the high-voltage battery, otherwise the voltage of the charging power source may be boosted to the level corresponding to the voltage standard level of the high-voltage battery and supplied, so that quick charging is performed by overcoming the limitation on the fixed output of the EVSE.

The charging preliminary information receiving operation S200 may include a vehicle stop information receiving operation S20 of receiving, as the vehicle stop information, whether the vehicle's gear is shifted to the P-stage which is the parking gear and whether the vehicle's speed is 0 KPH from the VCU before charging.

To this end, in the vehicle stop information receiving operation S210, the vehicle speed information may be received from a wheel speed sensor provided in the vehicle, and the gear stage information of the vehicle may be received from the VCU provided in the vehicle.

In addition, in the vehicle stop information receiving operation S210, the vehicle stop information may be received, and a protection mode execution request input by manipulating the AVN module by the driver may also be received from the VCU.

In addition, the charging preliminary information receiving operation S200 may further include a rotor angle receiving operation S220 of receiving the angle of the rotor that is stopped in a state where the vehicle is stopped and the parking gear is shifted to the P-stage from the resolver that measures the position of the rotor provided in the driving motor.

In this case, the angle of the rotor is an electric angle measured at a position where the permanent magnet of the rotor stops during one electric angle cycle of rotation in the driving motor including the rotor and the stator. Accordingly, as shown in (a) of FIG. 3, when the permanent magnet of the rotor is at the positions of A and −A of the stator, the angle of the rotor may be measured as '0 (zero)'. When the permanent magnet of the rotor is at the positions of B and −B, the angle of the rotor may be measured as 120°. When the permanent magnet of the rotor is at the positions of C and −C, the angle of the rotor may be measured as 240°. In addition, even when located in the space between them, it is possible to receive the rotor angle measured by the resolver.

In addition, the charging preliminary information receiving operation S200 may further include a charging current limitation receiving operation S230 of receiving the maximum intensity of charging current that can be supplied to the high-voltage battery for charging from the BMS.

That is, the rotor torque that continuously applies the stimulation to the parking sprag during charging increases in proportion not only to the angle of the rotor but also to the intensity of the current supplied to the three-phase coil of the driving motor.

Accordingly, in the charging preliminary information receiving operation S230, as preliminary information for calculating the maximum value of the rotor torque that may be generated during charging, the angle of the rotor and the maximum intensity of charging current supplied to the high-voltage battery may be received together.

In addition, the protection mode execution determining operation S300 may include a stop confirmation operation S310 of determining whether the vehicle is in a stopped state for charging based on the vehicle stop information, a rotor torque calculating operation S320 of calculating the magnitude of the rotor torque to be generated while charging is performed using the angle of the rotor and the maximum intensity of the charging current of the high-voltage battery, and a rotor torque comparing operation S330 of comparing the rotor torque with a preset reference torque, and inducing charging to start after executing the protection mode in which the rotor torque is reduced when the rotor torque is greater than the reference torque.

In this case, in the stop confirmation operation S310, by using the gear stage information and vehicle speed information of the vehicle obtained in the vehicle stop information receiving operation S210, it may be determined whether the vehicle is in a stop state in which the vehicle is chargeable.

In the case of the charging, the voltage is boosted by the switching operation of the inverter while current is supplied to the three-phase coil provided in the driving motor, and power transmission for charging the high-voltage battery is performed.

As described above, because the current is supplied to the driving motor, even when the vehicle is in a stop state, while the driving shaft rotates due to the current supplied to the driving motor for charging, power may be transmitted to the reduction gear and the differential gear.

Accordingly, in the stop confirmation operation S310, it may be determined whether the vehicle is stopped based on the vehicle speed information, and also determined whether the parking sprag is engaged with the teeth of the parking gear because the parking gear is positioned at the P-stage, which is the parking gear, based on the gear stage information of the vehicle.

As described above, in the state in which the gear of the vehicle is at the P-stage, the rotation of the driving shaft that may be unexpectedly caused may be prevented by the mechanical structure of the parking sprag that is engaged with the teeth of the parking gear.

In addition, in the rotor torque calculating operation S320, the rotor torque that is matched thereto by deriving the electric angle corresponding to the rotor angle from the previously stored rotor electric angle torque map may be calculated.

To this end, the electric angle torque map should be stored in advance by calculating the rotor torque that may be generated when the current is supplied to the driving motor for each electric angle of the rotor.

In this case, in the rotor torque calculating operation S320, it is possible to calculate the maximum value of rotor torque that is generated during charging by reflecting a change in torque increased by the maximum intensity of a charging current of the high-voltage battery in the rotor torque calculated based on the rotor angle.

That is, the rotor torque is generated by the force to align the magnetic field generated by the permanent magnet of the rotor according to the magnetic field generated by the current supplied to the three-phase coil of the driving motor, but the magnitude increases in proportion to the intensity of the current supplied to the three-phase coil.

Accordingly, in the rotor torque calculating operation S320, because the rotor torque may be calculated by reflecting the change in the magnitude of the torque that increases or decreases according to the intensity of the current supplied to the three-phase coil of the driving motor for charging, it is possible to calculate the maximum value of the rotor torque that may be generated during charging.

In addition, in the rotor torque comparing operation S330, by comparing the magnitude of the rotor torque with a preset reference torque, it is possible to determine whether to execute the protection mode in which the magnitude of the rotor torque may be reduced to less than the reference torque.

To this end, of course, the reference torque of the magnitude that will deteriorate or damage the parking sprag should be experimentally calculated in advance and stored in the memory or the like.

As a comparison result in the rotor torque comparing operation S330, when the magnitude of the rotor torque is smaller than that of the reference torque, the rotor torque that may be generated during charging may be determined as a small value that does not cause the parking sprag to deteriorates or damage to durability, so that it is possible to inform the driver that charging is possible in the current state through the AVN module or the like.

However, as a comparison result in the rotor torque comparing operation S330, when the magnitude of the rotor torque is larger than that of the reference torque (the same may be included according to the calculation definition of the reference torque), it is determined that the rotor torque that may be generated during charging causes the parking sprag to deteriorate or damage to durability, so that it is determined to execute the protection mode in which measures to reduce the rotor torque is induced.

In addition, the protection distance calculating operation S400 may include an electric angle difference calculating operation S410 of calculating a difference between the current rotor angle (electric angle) received from a resolver and the rotor angle (electric angle) when the rotor torque is 0 torque, and a protection distance calculating operation S420 of calculating, as the protection distance, the required travel distance to be moved to correct the current rotor angle to offset the electric angle difference by using the electric angle difference and a tire dynamic radius.

In this case, the rotor angle (electric angle) at which the rotor torque becomes 0 torque may be predetermined according to the current supply situation to the three-phase coil determined by the switching in the inverter.

Accordingly, in the electric angle difference calculating operation S410, by calculating the difference by comparing the current rotor angle (electric angle) and the rotor angle (electric angle) preset to 0 torque, it is possible to calculate an electric angle difference, which is a target value to be corrected in order to reduce the rotor torque.

In addition, the protection distance calculating operation S420, by using the electric angle difference calculated as to be offset for the reduction of the rotor torque, and the tire dynamic radius of the vehicle obtained in advance from the vehicle specification information, it is possible to calculate the vehicle travel distance required to put the rotor at the position where the rotor torque becomes '0 (zero)' as the protection distance.

That is, in order to offset the electric angle difference, the rotor must be rotated by the driving motor, and the power of the driving motor generated while rotating the rotor in this manner causes the rotation of the tire through the reducer and the differential gear. Accordingly, in order to correct the angle of the rotor, the vehicle must move to rotate the tire.

Accordingly, in the protection distance calculating operation S420, it is possible to calculate the required travel distance that the vehicle must move based on the degree of rotation of the tire required to rotate the rotor by the amount corresponding to the electric angle difference. To this end, the protection distance may be calculated by the same operation as in Equation 1 above.

In addition, a method of controlling charging of an electric vehicle according to an embodiment of the present disclosure may further include a vehicle movement inducing operation S500 of displaying, through the AVN module, the determination result to execute the protection mode in the protection mode execution determining operation S300 and the protection distance calculated in the protection distance calculating operation S400, so that a driver recognizes the result and the protection distance.

As described above, in the vehicle movement inducing operation S500, for safe charging through the AVN module provided in the vehicle, the driver must be aware that the movement of the vehicle is necessary to reduce the rotor torque, and the protection distance that the driver must move the vehicle is displayed to allow the driver to recognize together, thereby inducing the movement of the vehicle.

In this case, the actual travel distance of the vehicle moved by the driver may be calculated and expressed in real time as shown in FIG. 5, so that the vehicle is enabled to travel a more precise distance.

In addition, in the vehicle movement inducing operation S500, as shown in FIG. 5, after the vehicle movement is completed, the vehicle stop information and the rotor angle are received again, and then, it is possible to determine whether to re-execute the protection mode by calculating the rotor torque based on the newly measured rotor angle and comparing it with the reference torque.

As described above, it may be determined again whether the charging at the corrected location causes deterioration or damage of the parking sprag, and when it is required to re-execute the protection mode, by requiring additional movement of the vehicle, it is possible to stably execute the quick charging.

According to the embodiments of the present disclosure, by making the rotor torque that may be generated by the charging current input to the driving motor during quick charging by multiple input voltages smaller than the reference torque that may cause deterioration or damage of the parking sprag, it is possible to prevent components from being damaged by the rotor torque generated during charging.

In addition, it is possible to prevent the occurrence of a safety accident due to the movement of the vehicle, which may occur when the vehicle cannot be maintained in a stopped state due to damage of the parking sprag.

In addition, according to the embodiments of the present disclosure, it is possible to implement the protection mode execution determining device that calculates the rotor torque and executes the logic of comparing it with the reference torque, and the protection distance calculating device that executes the logic of calculating the protection distance that can minimize the rotor torque, and transmitting it to the AVN module to allow the driver to recognize it in the MCU already provided in the vehicle, thereby improving safety during quick charging by multiple input voltages without adding any components or systems.

In addition, various effects that are directly or indirectly understood through the present disclosure may be provided.

Although exemplary embodiments of the present disclosure have been described for illustrative purposes, those skilled in the art will appreciate that various modifications, additions and substitutions are possible, without departing from the scope and spirit of the disclosure.

Therefore, the exemplary embodiments disclosed in the present disclosure are provided for the sake of descriptions, not limiting the technical concepts of the present disclosure, and it should be understood that such exemplary embodiments are not intended to limit the scope of the technical concepts of the present disclosure. The protection scope of the present disclosure should be understood by the claims below, and all the technical concepts within the equivalent scopes should be interpreted to be within the scope of the right of the present disclosure.

What is claimed is:

1. An apparatus for controlling charging of an electric vehicle, the apparatus comprising:
   a quick charge determination module configured to compare a voltage level of a charging power source supplied from electric vehicle supply equipment (EVSE) with a level of a voltage standard received from a high-voltage battery provided in the electric vehicle to determine whether to directly supply or boost supply of the charging power source;
   an inverter configured to boost the voltage of the charging power source supplied from the electric vehicle supply equipment to a specified level or more and provide the boosted voltage to the high-voltage battery when the voltage level of the charging power source supplied for quick charging is less than the voltage standard;
   a driving motor provided with a stator three-phase coil receiving the charging power source from the electric vehicle supply equipment; and
   a protection mode control module configured to calculate rotor torque that is generated during charging based on an angle of a rotor provided in the driving motor before the quick charging, and induce the rotor torque to be less than a preset reference torque,
   wherein the protection mode control module includes:
      a charging preliminary information reception device configured to receive vehicle stop information, the angle of the rotor provided in the driving motor, and an intensity of a charging current of the battery before charging as preliminary information for determining whether to charge;
      a protection mode execution determining device configured to compare the rotor torque with the preset reference torque to determine whether to execute a protection mode after calculating the rotor torque expected to occur during the charging based on the angle of the rotor and the intensity of the charging current of the battery; and
      a memory configured to pre-calculate and store a magnitude of the reference torque that deteriorates or damages a parking sprag.

2. The apparatus of claim 1, wherein the charging preliminary information reception device is configured to receive the angle of the rotor in a vehicle stopped state from a resolver that measures a position of the rotor provided in the driving motor.

3. The apparatus of claim 1, wherein the protection mode execution determining device is configured to execute the charging when the rotor torque is less than the reference torque, and determine to execute the protection mode that induces the charging after taking action to reduce the rotor torque when the rotor torque is greater than the reference torque.

4. The apparatus of claim 1, wherein the protection mode control module further comprises:
   a rotor electric angle torque map configured to match and store the rotor torque for each electric angle of the rotor after calculating in advance the rotor torque expected to occur during charging corresponding to the electric angle of the rotor.

5. The apparatus of claim 1, wherein the protection mode control module further comprises:
   a protection distance calculating device configured to calculate, as a protection distance for executing the protection mode, a required travel distance of the electric vehicle required to correct a current rotor angle such that the rotor torque, which is expected to occur during the charging, is reduced to less than the reference torque when it is determined to execute the protection mode.

6. The apparatus of claim 5, wherein the protection distance calculating device is configured to calculate, as an electric angle difference, a difference between the current rotor angle received through a resolver and a rotor angle when the rotor torque is zero torque, and calculate, as the protection distance, the required travel distance to be moved to correct the rotor angle using the electric angle difference and a tire dynamic radius.

7. The apparatus of claim 5, further comprising:
an audio video navigation (AVN) module configured to receive and display whether the protection mode is executed and the protection distance to which a driver must move the vehicle from the protection distance calculating device.

8. The apparatus of claim 5, wherein the protection mode execution determining device is configured to compare the rotor torque recalculated based on the rotor angle corrected by movement of the electric vehicle with the reference torque again to determine whether to execute the protection mode additionally.

9. A method of controlling charging of an electric vehicle, the method comprising:
boosting a voltage of a charging power source to a specified level or higher and supplying the boosted voltage when a voltage level of the charging power source supplied from electric vehicle supply equipment (EVSE) is less than a voltage standard received from a high-voltage battery provided in the electric vehicle, otherwise determining to supply the voltage of the charging power source directly to the high-voltage battery;
receiving vehicle stop information, an angle of a rotor provided in a driving motor, and an intensity of a charging current supplied to the battery as preliminary information for determining whether to charge before charging is performed;
determining whether to execute a protection mode by comparing a rotor torque with preset reference torque after calculating the rotor torque expected to occur during charging based on the angle of the rotor and the intensity of the charging current;
calculating, as a protection distance, a required travel distance of the electric vehicle required to correct the angle of the rotor such that the rotor torque, which is expected to occur during the charging, is reduced to less than the reference torque when it is determined to execute the protection mode; and
displaying a result of a determination to execute the protection mode in the determining of the protection mode execution and the protection distance calculated in the calculating of the protection distance through an audio video navigation (AVN) module so that a driver recognize the result and the protection distance.

10. The method of claim 9, wherein receiving the charging preliminary information further includes receiving the angle of the rotor that is stopped in a state where the electric vehicle is stopped and a parking gear is shifted to stage P from a resolver that measures a position of the rotor provided in the driving motor.

11. The method of claim 9, wherein the determining of whether to execute the protection mode includes:
determining whether the electric vehicle is in a stopped state for charging based on the vehicle stop information; and
calculating a magnitude of the rotor torque to be generated while the charging is performed using the angle of the rotor and a maximum intensity of the charging current of the high-voltage battery.

12. The method of claim 11, wherein the determining of whether to execute the protection mode further includes:
comparing the rotor torque with the preset reference torque, and inducing the charging to start after executing the protection mode in which the rotor torque is reduced when the rotor torque is greater than the reference torque.

13. The method of claim 11, wherein calculating the rotor torque includes:
deriving an electric angle corresponding to the angle of the rotor from a previously stored rotor electric angle torque map, and calculating a rotor torque matched thereto.

14. The method of claim 11, wherein calculating the rotor torque includes:
calculating a maximum value of rotor torque that is generated during charging by reflecting a change in a torque increased by the maximum intensity of the charging current of the high-voltage battery in the rotor torque calculated based on the angle of the rotor.

15. The method of claim 11, wherein calculating the protection distance includes:
calculating a difference between a current rotor angle received from a resolver and a rotor angle when the rotor torque is zero torque; and
calculating, as the protection distance, the required travel distance to be moved to correct the current rotor angle to offset the electric angle difference by using the electric angle difference and a tire dynamic radius.

16. The method of claim 9, further comprising:
receiving the vehicle stop information and the angle of the rotor again after a vehicle movement is completed through vehicle movement guidance in the displaying of the result of the determination, and determining whether to re-execute the protection mode by comparing the rotor torque with the reference torque after calculating the rotor torque based on the corrected rotor angle.

* * * * *